US 8,675,984 B2

(12) United States Patent
Jia et al.

(10) Patent No.: US 8,675,984 B2
(45) Date of Patent: Mar. 18, 2014

(54) MERGING MULTIPLE EXPOSED IMAGES IN TRANSFORM DOMAIN

(75) Inventors: Wenhui Jia, Dublin, CA (US); Ajit Ninan, San Jose, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 159 days.

(21) Appl. No.: 13/410,885

(22) Filed: Mar. 2, 2012

(65) Prior Publication Data
US 2012/0224788 A1    Sep. 6, 2012

Related U.S. Application Data

(60) Provisional application No. 61/448,865, filed on Mar. 3, 2011.

(51) Int. Cl.
G06K 9/40 (2006.01)
H04N 5/235 (2006.01)

(52) U.S. Cl.
USPC .................................... 382/274; 348/229.1

(58) Field of Classification Search
USPC ......... 382/232–233, 248, 250, 251, 254, 274, 382/276, 284, 305, 312; 345/589, 629, 649, 345/672, 221.1, 222.1, 229.1, 340; 375/240.12, 240.3, 240.18, 240.2, 375/240.24
See application file for complete search history.

(56) References Cited

U.S. PATENT DOCUMENTS

| | | | |
|---|---|---|---|
| 6,975,354 B2 * | 12/2005 | Glotzbach et al. | 348/273 |
| 6,993,200 B2 | 1/2006 | Tastl | |
| 7,106,913 B2 * | 9/2006 | Castorina et al. | 382/284 |
| 7,149,262 B1 * | 12/2006 | Nayar et al. | 375/341 |
| 7,302,110 B2 | 11/2007 | Chesnokov | |
| 7,409,104 B2 * | 8/2008 | Vitsnudel et al. | 382/284 |
| 7,454,136 B2 | 11/2008 | Raskar | |
| 7,480,421 B2 | 1/2009 | Henley | |
| 7,508,421 B2 | 3/2009 | Tamaru | |
| 7,623,683 B2 | 11/2009 | Chen | |
| 8,275,042 B2 * | 9/2012 | Ma et al. | 375/240.16 |
| 8,406,569 B2 * | 3/2013 | Segall et al. | 382/294 |
| 2008/0094486 A1 | 4/2008 | Fuh | |
| 2009/0180704 A1 | 7/2009 | Wey | |
| 2010/0157078 A1 | 6/2010 | Atanassov | |

FOREIGN PATENT DOCUMENTS

WO    20100081229    7/2010

OTHER PUBLICATIONS

Debevec, P., et al., "Recovering High Dynamic Range Radiance Maps From Photographs" SIGGRAPH 1997.
Mann, S., et al., "On Being 'Undigital' with Digital Cameras: Extending Dynamic Range by Combining Differently Exposed Pictures" Proc. IS&T 46th Annual Conference, May 1995.

(Continued)

Primary Examiner — Kanjibhai Patel

(57) ABSTRACT

Techniques are provided to generate high or wide dynamic range image from two or more input images of different exposure settings by directly merging coefficients derived from the input images in a transform domain. Energy values may be determined from coefficients blocks derived from the input images. The energy values may be compared with thresholds to determine weight factors for the coefficient blocks. An output coefficient block in the transform domain, used in or used to generate the output image, may be determined as a weighted combination of the coefficient blocks in the transform domain derived from the input images. If input images are compressed in transform domain, an output image can be generated without performing decompression in transform domain.

36 Claims, 11 Drawing Sheets

(56) References Cited

OTHER PUBLICATIONS

Rovid, A., et al., "Method for Merging Multiple Exposure Color Image Data" Intelligent Engineering Systems, Apr. 16-18, 2009, pp. 27-31.

Rovid, A., et al., "Improved HDR Image Reconstruction Method" 12th WSEAS International COnference on Computers, Heraklion, Greece, Jul. 23-25, 2008, pp. 628-632.

Varkonyi-Koczy, A.R., et al., "Gradient-Based Synthesized Multiple Exposure Time Color HDR Image" IEEE Transactions, vol. 57, Issue 8, pp. 1779-1785, Aug. 2008.

Wu, Xiaojun, "A Novel Multiple Exposure Merging Method for High Dynamic Range Image Generation" Proceedings of the 2010 2nd International Conference on Signal Processing Systems.

Aydin, T. O., "Dynamic Range Independent Image Quality Assessment" International Conference on Computer Graphics and Interactive Techniques Archive ACM SIGGRAPH 2008.

* cited by examiner

I. Receive two or more input images comprising transform domain image data with different exposure settings II. Decompress any of the two or input images if it is compressed. Perform entropy decoding to any of the two or more input images if it is entropy coded.

III. Extract from each of two or more input images (e.g., with a VLC decoder) a plurality of luma coefficient blocks, a plurality of type I chroma blocks, and a plurality of type II chroma blocks IV. For each set of corresponding coefficient blocks:

1. For each luma coefficient block in the set of corresponding luma coefficient blocks:

i. Extract one or more luma coefficients from the luma coefficient block and determine an energy value ii. Determine a weight factor for the luma coefficient block iii. Merge all the luma coefficient blocks in the set of corresponding luma coefficient blocks as a weighted combination/sum using weight factors determined above, thereby generating an output luma coefficient block 2. Generate an output type I chroma coefficient block corresponding to the output luma coefficient block 3. Generate an output type II chroma coefficient block corresponding to the output luma coefficient block V. Output an HDR image comprising output luma coefficient blocks, output type I chroma coefficient blocks, and output type II chroma coefficient blocks

*FIG. 2A*

I. Receive two or more input images comprising spatial domain image data with different exposure settings II. Decompress any of the two or input images if it is compressed.

III. Divide each of the input images into pixel blocks and perform a frequency transform to convert the pixel blocks into a plurality of luma coefficient blocks, a plurality of type I chroma blocks, and a plurality of type II chroma blocks IV. For each set of corresponding coefficient blocks:

1. For each luma coefficient block in the set of corresponding luma coefficient blocks:

i. Extract one or more luma coefficients from the luma coefficient block and determine an energy value ii. Determine a weight factor for the luma coefficient block iii. Merge all the luma coefficient blocks in the set of corresponding luma coefficient blocks as a weighted combination/sum using weight factors determined above, thereby generating an output luma coefficient block 2. Generate an output type I chroma coefficient block corresponding to the output luma coefficient block 3. Generate an output type II chroma coefficient block corresponding to the output luma coefficient block V. Output an HDR image comprising output luma coefficient blocks, output type I chroma coefficient blocks, and output type II chroma coefficient blocks

*FIG. 2B*

MERGING MULTIPLE EXPOSED IMAGES IN TRANSFORM DOMAIN

CROSS-REFERENCE TO RELATED APPLICATIONS

This application claims priority to U.S. Provisional Patent Application No. 61/448,865 filed 3 Mar. 2011, which is incorporated herein by reference in its entirety.

TECHNICAL FIELD

The present invention relates generally to imaging processing, and in particular, to high dynamic range (HDR) image processing.

BACKGROUND

Real world scenes may have contrast ratios of as much as 50,000:1 between the brightest highlights and the darkest shadows. Many existing cameras do not support HDR because of the high costs associated with HDR image acquisition under existing approaches. For example, image sensors that are capable of producing differentiating responses to a wide range of luminance levels are expensive to manufacture. Even if deployed at a high cost, a large volume of image data requiring expensive processing power to process would be generated.

Most consumer devices do not have a native HDR image acquisition capability. To approximate an HDR image, multiple non-HDR images of a scene may first be taken with different exposure settings, and may be merged in the spatial domain by image processing software. In order to determine a suitable approximate luminance level of a pixel in an output image, multiple images are used to provide a wide dynamic range of luminance on a pixel-by-pixel basis. A consumer-grade device may create the above-mentioned multiple images in the form of compressed files in a transform domain. To read out luminance levels at a specific pixel, the compressed files must undergo decompression and transformation from the transform domain to the spatial domain. Image data in the spatial domain, as derived from the compressed files, may then be merged and reconstructed into an HDR image. The HDR image may be tone-mapped, domain transformed, and compressed to produce a tone-mapped image (e.g., with 8 bits per color value such as R, G, or B color value) approximating the HDR image of a scene. These techniques require complex logic and high computation costs, and hence are difficult and expensive to be implemented in consumer-grade devices.

As a result, many existing image acquisition devices are not capable of taking advantage of the fact that an HDR image can be created by merging multiple images of the same scene.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 2A and FIG. 2B illustrate example procedures for transform domain merging image data, according to possible embodiments of the present invention;

DESCRIPTION OF EXAMPLE POSSIBLE EMBODIMENTS

Figure 1A:
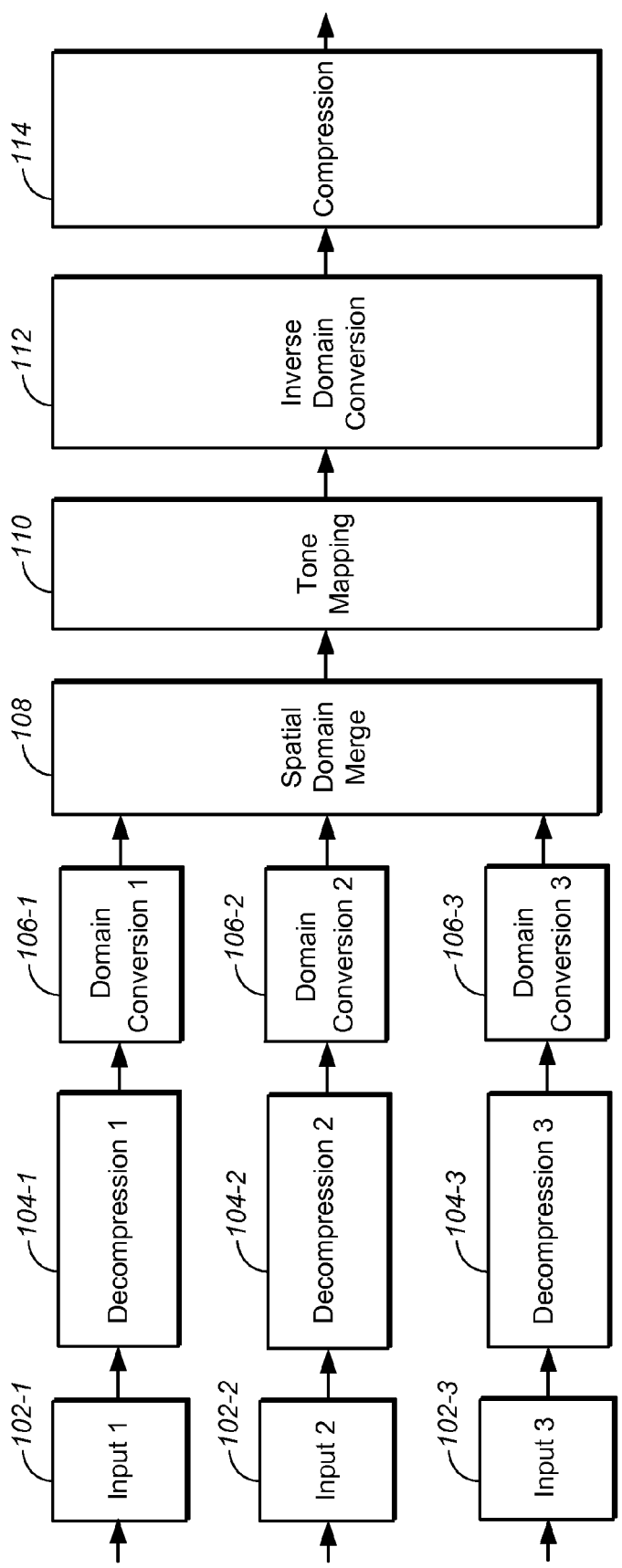
FIG. 1A illustrates spatial domain merging image data.

Example possible embodiments, which relate to merging multiple images in a transform domain, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily including, obscuring, or obfuscating the present invention.

Example embodiments are described herein according to the following outline:
1. GENERAL OVERVIEW
2. MERGING COMPRESSED IMAGES IN SPATIAL DOMAIN
3. MERGING COMPRESSED IMAGES IN TRANSFORM DOMAIN
4. MERGING UNCOMPRESSED IMAGES IN TRANSFORM DOMAIN
5. MERGE PROCEDURES
6. EXAMPLE PROCESS FLOW
7. IMPLEMENTATION MECHANISMS—HARDWARE OVERVIEW
8. EQUIVALENTS, EXTENSIONS, ALTERNATIVES AND MISCELLANEOUS

1. General Overview

This overview presents a basic description of some aspects of a possible embodiment of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiment in a condensed and simplified format, and should be understood as merely a conceptual prelude to a more detailed description of example possible embodiments that follows below.

Many cameras are configured to take non-HDR images and output them in compressed image data in a transform domain. For example, a point-and-shoot camera, standalone or implemented in a handheld computing device, may output a non-HDR image as a JPEG file. A computing device (which may be the point-and-shoot camera itself) that receives multiple non-HDR images (e.g., with 8-bit color values) may use the non-HDR images to reconstruct an intermediate HDR image (e.g., with 16-bit color values), tone map it to an 8-bit image, and compress it to output a tone-mapped version of the HDR image in a JPEG file instead of the intermediate HDR image.

As used herein, "a transform domain" may refer to a non-spatial domain. Examples of transform domains may include, but are not limited to, a frequency domain, a two-dimensional frequency domain, a DCT (digital cosine transform) domain, DST (digital sine transform) domain, a DFT (digital Fourier transform) domain, etc.

Under techniques herein, luminance and color information in multiple non-HDR images may be directly merged in a transform domain, even in a compressed form, avoiding (1) merging in the spatial domain and/or (2) undergoing complex tone-mapping for converting high numbers-of-bits values in an intermediate HDR image to low numbers-of-bits values in a tone-mapped image that approximates the HDR image and/or (3) undergoing secondary quantization/compression. In some possible embodiments, a tiny portion (which may be an energy value as will be further explained in detail below) of image data in the transform domain may be used to determine whether a particular pixel block in a non-HDR image in the spatial domain is low-luminance, mid-luminance, or high-luminance region of the original scene. Based on this determination, output coefficient blocks in the transform domain may be derived by performing extremely simple operations (e.g., linear operations, scaling, weighted sums, etc.) on coefficient blocks in the transform domain derived from multiple input images.

As used herein, a coefficient block may refer to, but is not limited only to, any data unit that comprises coefficients in a transform domain. Examples of coefficient blocks may include, but are not limited to, matrices, minimum coded units (MCUs), macroblocks with different sampling rates, etc. A coefficient block in an input non-HDR image herein may comprise coefficients of a digital transformation of pixel values in a particular pixel block in a particular channel. As used herein, a channel may refer to image data for a particular component of a color space (e.g., a luma or chroma channel comprising luma or chroma image data). A pixel block herein may comprise two or more pixel values in the spatial domain. In some embodiments, the digital transformation may be, but is not limited to, a DCT, a DST, DFT, etc.

In some possible embodiments, one, two, or more coefficients in a coefficient block comprising luma coefficients in a transform domain may be used to determine an energy value. This energy value may scale with an average of luma values in a corresponding pixel block in the spatial domain. In some possible embodiments, the energy value (e.g., the upper left coefficient in a DCT coefficient block in a JPEG image file if the DCT coefficient block is represented by a matrix) linearly scales with the average luma value of the pixel block. In some possible embodiments, the energy value may be used to determine whether a corresponding pixel block (which corresponds to a coefficient block from which the energy value may be determined) in the spatial domain is low-luminance, mid-luminance, or high-luminance. Determining whether a pixel block in the spatial domain is low-luminance, mid-luminance, or high-luminance, based on an energy value from a coefficient block in the transform domain, may be repeated for each of coefficient blocks in the transform domain that correspond to pixels blocks comprising two or more non-HDR images in the spatial domain of the same scene. A weight factor for the contribution of a coefficient block in the transform domain as derived from an input image may be determined. This contribution of the coefficient block may be combined with other contributions of other coefficient blocks in the transform domain as derived from other input images, to produce an output coefficient block in the transform domain. The output coefficient block and other similarly derived output coefficient blocks may be used to produce a wide or high dynamic range image of the scene.

In some possible embodiments, different coefficient blocks from a non-HDR image may represent different pixel blocks in a particular channel. For example, a first coefficient block may be a DCT representation of pixel values in a first pixel block in a luma channel, while a second different coefficient block may be a DCT representation of pixel values in a second different pixel block in the luma channel.

In some possible embodiments, energy values in all coefficient blocks (in the transform domain), or a distribution of the energy values, from one or more non-HDR input images may be analyzed. In some possible embodiments, these coefficient blocks may be selected from a particular channel, for example, the luma channel. In an example, the energy values may be used to construct one or more histograms. The distribution of energy values may be used to determine whether a specific energy value in a coefficient block indicates that a corresponding pixel block in the spatial domain is low-luminance (shadow), mid-luminance (mid-tone), or high-luminance (highlight). In some possible embodiments, sets of thresholds may be created based on the analysis of the energy values. The thresholds may then be used in comparison with energy levels for the purpose of determining whether their coefficient blocks or corresponding pixel blocks may represent pixel blocks that are likely to be low-luminance (shadow), mid-luminance (mid-tone), or high-luminance (highlight). Based on comparison results with the thresholds, different coefficient blocks in different non-HDR input images may be assigned different weights. In some possible embodiments, zero (e.g., masking off any contribution from a coefficient block whose luma coefficients are highly saturated) or relatively small values may be assigned to coefficient blocks (derived directly or indirectly from the input images) whose energy values are not within their corresponding thresholds. An output coefficient block for the output image may be a selectively weighted combination of the different coefficient blocks derived from the input images.

In some possible embodiments, thresholds for comparing with energy values may locally vary in spatial dimensions of input images. For example, if x and y may be used to indicate a position in the spatial domain, thresholds at different x and y values may be different in some possible embodiments. In some possible embodiments, different spatial segments of an input image may be configured to use different sets of thresholds. A segment as described herein may be of any shape or size including, but not limited to, a programmatically determined section based on image data.

In some possible embodiments, values to weight factors assigned to coefficient blocks in input images may locally vary in spatial dimensions of the input images. In some possible embodiments, different spatial segments of an input image may be configured to use different values of weight factors.

In some possible embodiments, an (non-HDR, HDR, wide dynamic range, etc.) input image herein may comprise pixel values in the spatial domain. The pixel values of the input image may be used to produce coefficient blocks in the transform domain.

In some other possible embodiments, an input image herein may already comprise coefficients in the transform domain in different channels. In these embodiments, coefficient blocks in one (e.g., a luma channel) of the channels may comprise luma coefficients. In particular embodiment, the channels are associated with a color space with a luma component (e.g., in a YUV color space). If a non-HDR image herein may comprise coefficient blocks in channels that are not associated with a color space with a luma component, coefficients in such a color space may be transformed to coefficients in a color space with luma component. As a result, coefficient blocks with transformed coefficients may be generated such that the coefficient blocks include those in a luma channel. In some embodiments, the transformation of color spaces may be performed through linear operations (e.g., operations used to convert from RGB to YUV).

In some possible embodiments, an input image herein may comprise uncompressed image data (e.g., in a JPEG file with no compression, in a raw image file, etc.). On the other hand, in some other possible embodiments, an input image herein may comprise compressed image data (e.g., in a JPEG format, a lossy compression format, a lossless compression format, etc.), but may be uncompressed under techniques herein.

In some possible embodiments, an input image may comprise or be used to derive/provide coefficient blocks of other types of coefficients in addition to luma coefficient blocks. In some possible embodiments, the other types of coefficients may comprise coefficients for color space components such as chroma, hue, chroma difference, etc. In some possible embodiments, a non-luma coefficient block (e.g., a chroma coefficient block) from one of the input images that is associated with the largest contributing luma coefficient block may be used as an output non-luma coefficient block for the output image. Other ways of generating an output non-luma image may be used. For example, instead of using a non-luma coefficient block associated with the largest contributing luma coefficient block, a weighted combination of non-luma coefficient blocks from the input images may be used. In some possible embodiments, the same weight factors for a weighted combination of luma coefficient blocks may be used for a weighted combination of non-luma coefficient blocks. In some possible embodiments, different weight factors different from those for a weighted combination of luma coefficient blocks may be used for a weighted combination of non-luma coefficient blocks.

Thus, techniques as described herein may be used to combine the best-exposed coefficient blocks, possibly with relatively small contributions from other coefficient blocks, of input images into output coefficient blocks for an output image. Thus, the output image may comprise properly the best exposed details from all the input images. Furthermore, since the above-mentioned combinations may be generated directly with coefficients in lower numbers of bits in the input images, tone mapping including converting coefficients in higher numbers of bits to coefficients in lower numbers of bits may be avoided under techniques as described herein.

In some possible embodiments, techniques as described herein may include zero, one, or more of various types of image processing operations, which may include, but is not limited to, domain transformation, inverse domain transformation, compression/decompression, color space conversion, removal of artifacts in output images, image post-processing, etc.

Under techniques as described herein, merging multiple images may be performed directly in the transform domain, even with coefficient blocks in certain forms of compression such as quantization. For example, in some possible embodiments, the above discussed merging in the transform domain may be performed directly with quantized coefficient block. In various possible embodiments, image degradation that would have incurred by a second time compression and/or decompression under other techniques may be avoided under techniques as described herein.

As this discussion shows, techniques herein may be inexpensively and efficiently implemented in many different types of computing devices including consumer-grade handheld devices for the purpose of supporting HDR images with multiple exposed input images. These computing devices may include (but are not limited to) those cameras that only output compressed JPEG images. In all these computing devices, techniques as described herein provide high performance and low complexity in creating HDR images from multiple input images. Possible applications include but are not limited to in-camera HDR capture with off-camera HDR merge. Some or all of the techniques may be implemented with cell phones having an embedded camera, smart phones, digital still cameras (DSCs), and Digital Single Lens Reflex (DSLR) cameras, PC software for photo editing, plugin to photo editing software, media servers, studios, etc.

In some possible embodiments, techniques as described herein may be implemented by a display system that is configured to receive multiple input images of a scene and directly merge multiple images for rendering in various types of display panels or units. For example, techniques may be implemented by a display device or by a computing device that works in conjunction with a display device to directly merge multiple images into an HDR image for rendering on the display device.

In some possible embodiments, techniques as described herein may be used (e.g., as a plug-in module, API, etc.) to enable photo or video editing software (e.g., Photoshop, iPhoto, etc.) to directly merge images with multiple exposures to produce HDR images.

In some possible embodiments, mechanisms as described herein form a part of a display system, including but not limited to: a television, a laptop computer, netbook computer, cellular radiotelephone, electronic book reader, point of sale terminal, desktop computer, computer workstation, computer kiosk, various other kinds of terminals and display units, etc.

Various modifications to the possible embodiments and the generic principles and features described herein will be readily apparent to those skilled in the art. Thus, the disclosure is not intended to be limited to the embodiments shown, but is to be accorded the widest scope consistent with the principles and features described herein.

2. Merging Compressed Images in Spatial Domain

FIG. 1A illustrates example processing of multiple image data inputs (e.g., 102-1 through 102-3) into a tone-mapped image which may approximate an HDR image. Input 1 (102-1), Input 2 (102-2), and Input 3 (102-3) may comprise separate image data for three separate images of a scene, as captured with different exposure settings. The inputs (102-1 through 102-3) for multiple images may be provided in the JPEG format.

Decompressions (104-1 through 104-3) may be performed on the inputs (102-1 through 102-3), respectively, to derive uncompressed image data for the images. Each of the decompressions (104-1 through 104-3) may include applying a plurality of computation-intensive algorithms (e.g., variable length coding (VLC), entropy encoding, quantization, etc.) related to lossless or lossy data compression that was previously performed on the image data contained in the inputs (102-1 through 102-3).

Domain conversions (106-1 through 106-3) may then be performed on the uncompressed image data derived from the inputs (102-1 through 102-3). The domain conversions (106-1 through 106-3) may include applying one or more transformations (e.g., inverse DCT, inverse DFT, etc.). As a result, the uncompressed image data in the transform domain may be converted into uncompressed image data in the spatial domain. The uncompressed image data in the spatial domain may provide luminance information on a pixel-by-pixel basis. Additional image processing such as gamma correction/expansion, color space conversion, etc., may also be performed on the uncompressed image data in the spatial domain.

Spatial domain merging (108) may then be performed to merge the luminance information from three different exposure settings for each pixel, as specified in the uncompressed image data in the spatial domain obtained in the above-described steps. The results of this merge may be an intermediate HDR image that uses a high number of bits (relative to the images specified in the inputs) to capture luminance information from the input (102-1 through 102-3).

Tone mapping (110) may be performed on the intermediate HDR image to produce a tone-mapped image that approximates the dynamic range of the intermediate HDR. While the intermediate HDR image may use a high number of bits (e.g., 16-bit values) to capture merged luminance information which was originally specified with a relatively low number of bits (e.g., 8-bit values) in the uncompressed data in the spatial domain, the tone-mapped image may be obtained by scaling or mapping the high number of bits in the intermediate HDR image to a lower number of bits (e.g., 8-bit values) to approximate the high dynamic range in the intermediate HDR image.

Inverse domain conversion (112) may be performed on the tone-mapped image to produce tone-mapped image data in the transform domain. Compression (114) (e.g., including quantization and/or VLC compression, etc.) may be performed on the tone-mapped image data to generate an output image file (e.g., in a JPEG file, another compressed file format, etc.).

3. Merging Compressed Images in Transform Domain

Figure 1B:
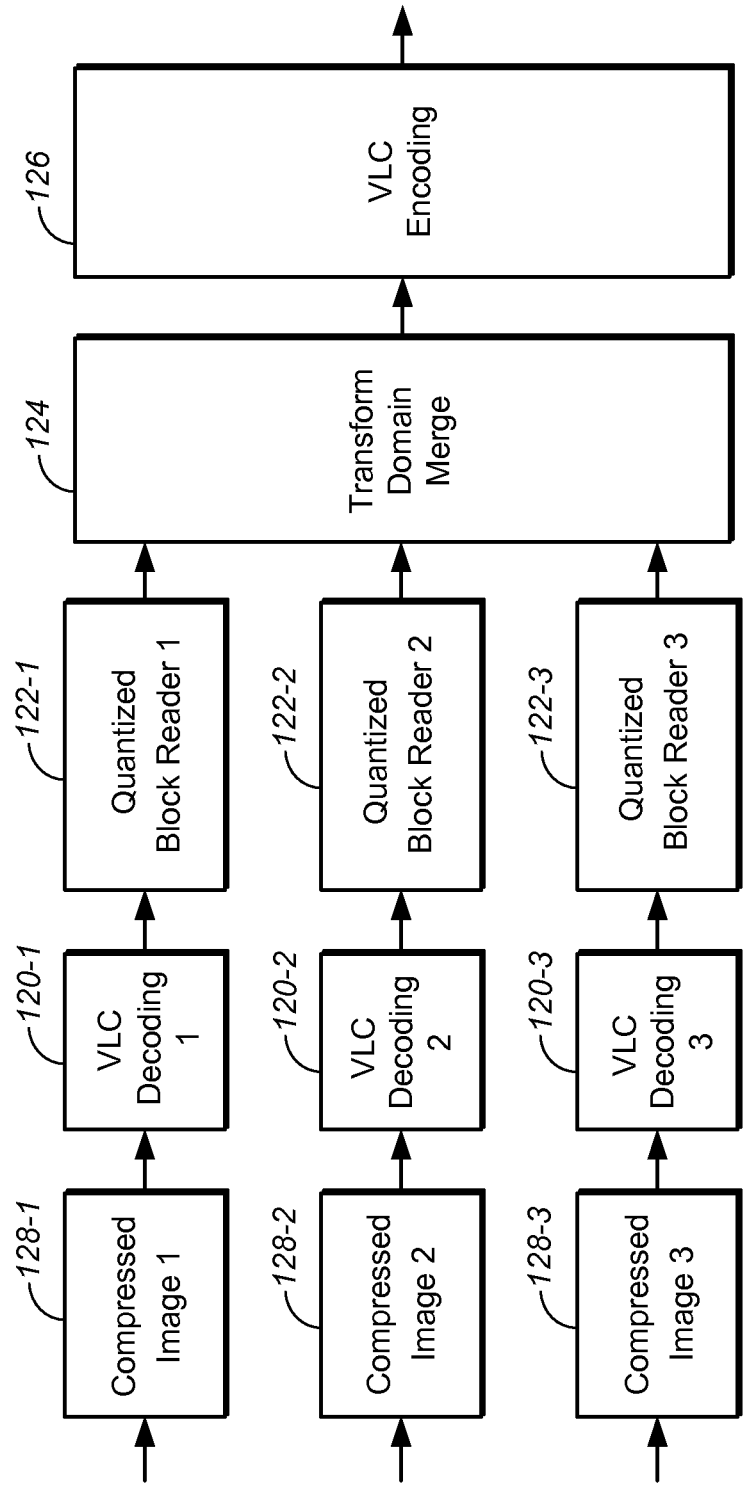
FIG. 1B, FIG. 1C and FIG. 1D illustrate example processing components for transform domain merging image data, according to possible embodiments of the present invention.

FIG. 1B illustrates example components to process multiple compressed images (e.g., 128-1 through 128-3) into an output HDR image (1) with direct merging in a transform domain of luminance information from the multiple images, (2) without tone mapping, and (3) without secondary lossy compression, in accordance with some possible embodiments of the present invention. Compressed images 1 through 3 (128-1 through 128-3) may be of the same scene, but captured with at least two different exposure settings. Compressed image 1 (128-1) may comprise compressed image data in a transform domain (e.g., DCT, etc.) obtained with a first exposure setting (e.g., an optimal exposure setting); Compressed image 2 (128-2) may comprise compressed image data in the transform domain with a second exposure setting (e.g., an overexposure setting); Compressed image 3 (128-3) may comprise compressed image data in the transform domain with a third exposure setting (e.g., an underexposure setting).

In various possible embodiments, zero, one, or more of the multiple compressed images may be provided in the JPEG format with lossy compression. For the purpose of illustration only, three compressed images are used to produce the HDR image. It should be noted that the present invention is not so limited. In various other possible embodiments, two, four, or another plurality of input images with at least two different exposure settings may be used to generate an output image of a wider dynamic range than that of the input images.

In some possible embodiments, one or more of the compressed images (128-1 through 128-3) may comprise image data compressed with one or more compression algorithms, which may be, but are not limited to, lossy compression algorithm (e.g., quantization matrix) and lossless compression algorithm (e.g., Huffman, entropy encoding, variable length code (VLC), etc.). As illustrated in FIG. 1B, separate (e.g., parallel) decoding such as VLC decoding (120-1 through 120-3) may be performed on the compressed images (128-1 through 128-3) to derive separate decoded image data from the input images. The decoded image data may be outputted as quantized coefficient blocks. For example, the decoded image data derived from compressed image 1 (128-1) may be outputted as a first plurality of quantized coefficient blocks; the decoded image data derived from compressed image 2 (128-2) may be outputted as a second plurality of quantized coefficient blocks; the decoded image data derived from compressed image 3 (128-3) may be outputted as a third plurality of quantized coefficient blocks. The quantized coefficient blocks may be provided to the next processing blocks in any of a plurality of forms such as streams, queues, arrays, sequences, data structures, matrices, etc.

In some embodiments, a quantized coefficient block is derived from dividing blocks of coefficients in a transform domain as converted from pixel values in the spatial domain with a quantization matrix. In various possible embodiments, this quantization matrix may be proprietary or standard-based. For example, a quantization matrix defined in an industry standard for JPEG may be used to derive quantized coefficient blocks from non-quantized blocks of coefficient converted from image data in the spatial domain. In some possible embodiments, the same quantization matrix may be used to derive all the quantized coefficient blocks in the compressed images (128-1 through 128-3). In some possible embodiments, different quantization matrices may be used to derive different quantized coefficient blocks in the compressed images (128-1 through 128-3); but these different quantization matrices may comprise simple relationships (e.g., linear) that allow easy conversions and comparisons between any two of the quantization matrices.

In some possible embodiments, a quantized block reader 1 (122-1) may read one or more quantized coefficient blocks in the first plurality of quantized coefficient blocks in series, in parallel, or part in series and part in parallel. Similarly, quantized block readers 2 and 3 (122-2 and 122-3) may respectively read quantized coefficient blocks in the second and third pluralities of quantized coefficient blocks in series, in parallel, or part in series and part in parallel. In some possible embodiments, the block reading operations of the quantized block readers (122-1 through 122-3) may be coordinated under the techniques herein. For example, when one (e.g., 122-1) of the quantized block readers (122-1 through 122-3) reads one or more first quantized coefficient blocks from the first plurality of quantized coefficient blocks derived from image 1 (128-1), the others (122-2 and 122-3 in the present example) of the quantized block readers (122-1 through 122-3) may read one or more corresponding second quantized coefficient blocks from the second plurality of quantized coefficient blocks derived from image 2 (128-2) and one or more corresponding third quantized coefficient blocks from the third plurality of quantized coefficient blocks derived from image 3 (128-3). As used herein, the first quantized coefficient blocks, the second quantized coefficient blocks, and the third quantized coefficient blocks correspond to one another if these quantized coefficient blocks comprise image data portions in the transform domain corresponding to the same portion of the scene. A set of corresponding quantized coefficient blocks may comprise two or more corresponding quantized coefficient blocks (three in the present example: one each from the images (128-1 through 128-3)), each of which is derived from a different image among the images (128-1 through 128-3); the quantized coefficient blocks in the set are of the same channel (e.g., luma, chroma, hue, etc.) in accordance with the prevailing or a common reference color space (e.g., YUV, etc.) for the images 1 through 3. In an example, a set of corresponding quantized coefficient blocks may comprise quantized luma coefficients. In another example, a set of corresponding quantized coefficient blocks may comprise quantized chroma coefficients.

One or more sets of corresponding quantized coefficient blocks may be provided as input to the next processing stage, e.g., transform domain merge (124). For each set of corresponding quantized coefficient blocks, the transform domain merge (124) performs merging quantized coefficient blocks in that set directly in the transform domain. For example, if the quantized coefficient blocks in a set of corresponding quantized coefficient blocks are made up of luma coefficients (e.g., quantized), an output quantized luma coefficient block may be generated as a weighted combination of the quantized luma coefficient blocks.

In an example, a weighted combination of quantized coefficient blocks may include a combination in which each quantized coefficient block in a set of corresponding quantized coefficient blocks is assigned a non-zero weight; in some cases, a weighted combination generated from a set of corresponding quantized coefficient blocks may comprise all quantized coefficient blocks' contributions from the set of corresponding quantized coefficient blocks. For instance, in a possible embodiment, a set of corresponding quantized luma coefficient blocks may be used to generate an output quantized luma coefficient block, wherein the output quantized coefficient block may comprise all quantized coefficient blocks' contributions in the set of corresponding quantized luma coefficient blocks.

In another example, a weighted combination of quantized coefficient blocks under techniques described herein may include a combination in which one or more quantized coefficient blocks in a set of corresponding quantized coefficient blocks are assigned a zero or relatively small weight; in some cases, a weighted combination generated from a set of corresponding quantized coefficient blocks may comprise only one quantized coefficient block's contribution while other quantized coefficient blocks in the set are assigned zero weights. For instance, in a particular embodiment, a set of corresponding quantized chroma coefficient blocks (e.g., quantized) may be used to generate an output quantized chroma coefficient block, wherein the output quantized coefficient block may comprise only one quantized coefficient block's contribution, while other quantized chroma coefficient blocks in the set may be given no or little weight.

Under techniques described herein, in some possible embodiments, quantized coefficients in a set of corresponding quantized coefficient blocks—without undergoing an inverse quantization operation to recover/approximate non-quantized (e.g., approximate) coefficients in the transform domain from which the quantized coefficients were derived—may be directly used in merging operations as described above.

In some possible embodiments, transform domain merge (124) may generate a plurality of output quantized coefficient blocks based on pluralities of quantized coefficient blocks from the compressed images (e.g., 128-1 through 128-3). The plurality of output quantized coefficient blocks may comprise details and dynamic ranges from all the compressed images (128-1 through 128-3), resulting in a wide or high dynamic range output image. In some possible embodiments, VLC encoding (126) may be applied to the plurality of output quantized coefficient blocks to produce the output image. In some possible embodiments, the output image may be in the JPEG format.

4. Merging Uncompressed Images in Transform Domain

Figure 1C:
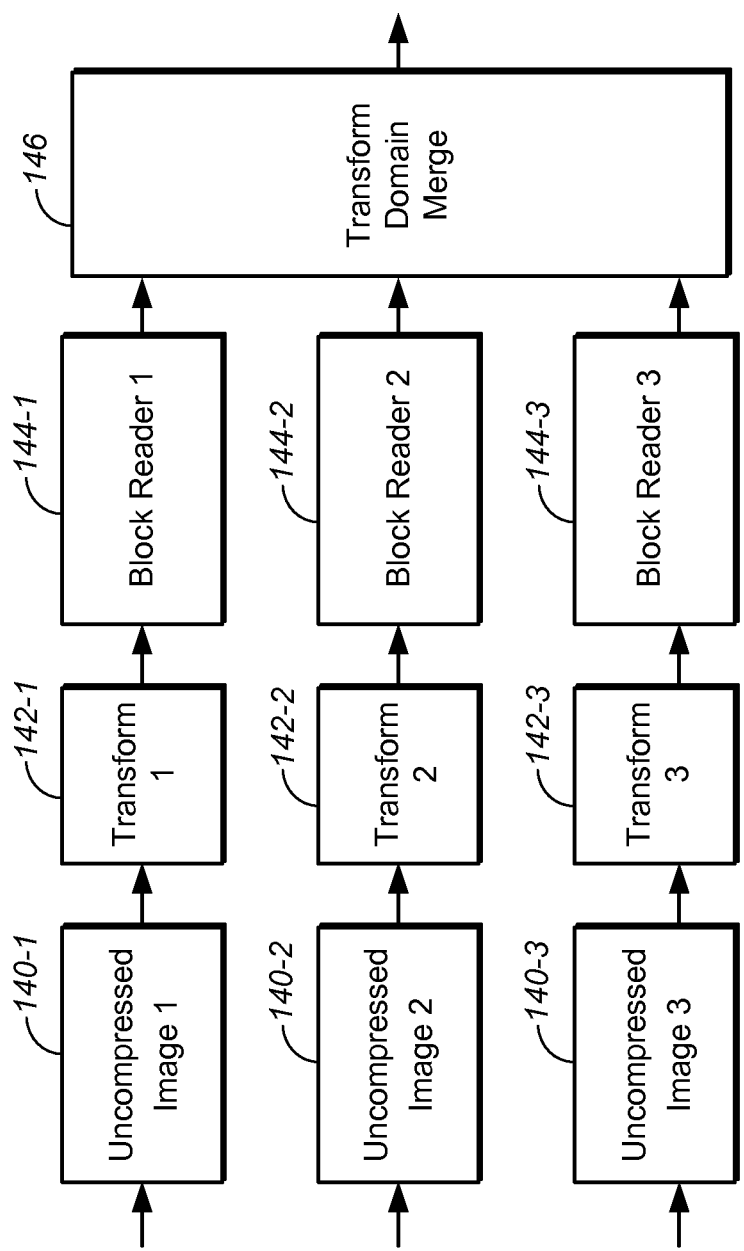

FIG. 1C illustrates example components to process multiple uncompressed images (e.g., 140-1 through 140-3) into an output HDR image (1) with direct merging in a transform domain of luminance information from the multiple images, and (2) without tone mapping, in accordance with some possible embodiments of the present invention. Uncompressed images 1 through 3 (140-1 through 140-3) may be of the same scene, but captured with at least two different exposure settings. Uncompressed image 1 (140-1) may comprise uncompressed image data in a spatial domain obtained with a first exposure setting (e.g., an optimal exposure setting). Similarly, uncompressed image 2 (140-2) may comprise uncompressed image data in a spatial domain with a second exposure setting (e.g., an overexposure setting); and uncompressed image 3 (140-3) may comprise uncompressed image data in a spatial domain with a third exposure setting (e.g., an underexposure setting).

For the purpose of illustration only, three input images in the spatial domain are used to produce the HDR image. It should be noted that the possible embodiments discussed herein are not so limited. In various other possible embodiments, two, four, or another plurality of input images in the spatial domain with at least two different exposure settings may be used to generate an output image of a wider dynamic range than that of the input images.

As illustrated in FIG. 1C, separate (e.g., parallel) transforms (142-1 through 142-3) may be performed on the uncompressed images (142-1 through 142-3) to convert image data from the spatial domain to a transform domain (e.g., two-dimensional frequency domain in association with a digital transform such as DCT, DFT, etc.). In some possible embodiments, uncompressed images (140-1 through 140-3) may comprise pixel values in a color space with a luma component such as a YUV color space. In some other possible embodiments, uncompressed images (140-1 through 140-3) may comprise pixel values in a color space with no luma component such as an RGB color space. A color space transformation may be performed, for example, before, after, or at the same time as, the domain transformation from the spatial domain to the transform domain. A color space transformation may be performed on each of the uncompressed images (140-1 through 140-3) to convert pixel values or coefficients in the color space with no luma component to pixel values or coefficients in a color space (e.g., YUV) with a luma component. The image data in the transform domain in a suitable color space (e.g., with a luma component) may comprise coefficient blocks (e.g., quantized or non-quantized) including luma coefficient blocks. For example, the converted image data derived from uncompressed image 1 (140-1) may be outputted as a first plurality of coefficient blocks; the converted image data derived from uncompressed image 2 (140-2) may be outputted as a second plurality of coefficient blocks; the converted image data derived from uncompressed image 3 (140-3) may be outputted as a third plurality of coefficient blocks. These coefficient blocks may be provided to the next processing blocks in any of a plurality of forms such as streams, queues, arrays, sequences, data structures, matrices, etc.

In some possible embodiments, a block reader 1 (144-1) may read one or more coefficient blocks in the first plurality of coefficient blocks in series, in parallel, or part in series and part in parallel. Similarly, block readers 2 and 3 (144-2 and 144-3) may respectively read coefficient blocks in the second and third pluralities of coefficient blocks in series, in parallel, or part in series and part in parallel. In some possible embodiments, a controller may be used to coordinate the block reading operations of the block readers (144-1 through 144-3) under the techniques described herein. For example, when one (e.g., 144-1) of the block readers (144-1 through 144-3) reads one or more first coefficient blocks from the first plurality of coefficient blocks derived from uncompressed image 1 (140-1), the others (144-2 and 144-3 in the present example) of the block readers (144-1 through 144-3) may read one or more corresponding second coefficient blocks from the second plurality of coefficient blocks derived from uncompressed image 2 (144-2) and one or more corresponding third coefficient blocks from the third plurality of coefficient blocks derived from uncompressed image 3 (144-3). As used herein, the first coefficient blocks, the second coefficient blocks, and the third coefficient blocks correspond to one another if the coefficient blocks are of the same channel and if the coefficient blocks comprise image data portions in the transform domain corresponding to the same portion of the scene. A set of corresponding coefficient blocks may comprise two or more corresponding coefficient blocks (three in the present example: one each from the images (140-1 through 140-3)), each of which is derived from a different one of the uncompressed images (140-1 through 140-3); the coefficient blocks in the set are of the same channel (e.g., luma, chroma, hue, etc.) in the color space (e.g., YUV). In an example, a set of corresponding coefficient blocks may comprise luma coefficients. In another example, a set of corresponding coefficient blocks may comprise chroma coefficients.

One or more sets of corresponding coefficient blocks may be provided as input to the next processing stage, transform domain merge (146). For each set of corresponding coefficient blocks, the transform domain merge (146) may perform merging coefficient blocks in that set directly in the transform domain. For example, if the coefficient blocks in a set of coefficient blocks are made up of luma coefficients (e.g., quantized or non-quantized), an output luma coefficient block may be generated as a weighted combination of the luma coefficient blocks based on the set of corresponding coefficient blocks.

In an example, a weighted combination of coefficient blocks may include a combination in which each coefficient block in a set of corresponding coefficient blocks is assigned a non-zero weight; in some cases, a weighted combination generated from a set of corresponding coefficient blocks may comprise all coefficient blocks' contributions from the set of corresponding coefficient blocks. For instance, in a possible embodiment, a set of corresponding luma coefficient blocks may be used to generate an output luma coefficient block, wherein the output luma coefficient block may comprise all luma coefficient blocks' contributions in the set of corresponding luma coefficient blocks.

In another example, a weighted combination of coefficient blocks may include a combination in which one or more coefficient blocks in a set of corresponding coefficient blocks are assigned a zero or a small weight; in some cases, a weighted combination generated from a set of corresponding coefficient blocks may comprise only one coefficient block's contribution while other coefficient blocks in the set are assigned zero weights. For instance, in a possible embodiment, a set of corresponding chroma coefficient blocks may be used to generate an output chroma coefficient block, wherein the output chroma coefficient block may comprise only one chroma coefficient block's contribution, while other chroma coefficient blocks in the set may be given no or little weight.

Under techniques described herein, in some possible embodiments, coefficients in a set of corresponding coefficient blocks may be used directly in merging operations as described above.

In some possible embodiments, transform domain merge (146) may generate a plurality of output coefficient blocks based on pluralities of coefficient blocks derived from the uncompressed images (e.g., 140-1 through 140-3). The plurality of output coefficient blocks comprises details and dynamic ranges from all the uncompressed images (140-1 through 140-3), resulting in a wide or high dynamic range output image.

In some possible embodiments, the HDR output image comprising the plurality of output coefficient blocks may be provided to other software and/or hardware for further processing including storing, transmitting, image processing, etc.

In some possible embodiments, lossless or lossy encoding and compression may be applied to the plurality of output quantization blocks to produce an output compressed image.

In some possible embodiment, inverse domain transform (e.g., Inverse DCT, Inverse DFT, etc.) may be performed on the HDR output image to produce an output image in the spatial domain, either compressed or uncompressed. In an example, entropy coding (e.g., VLC) may be further applied to the HDR output image to create a compressed HDR image. In another example, inverse transformation may be further applied to the HDR output image to create an uncompressed HDR image in a spatial domain.

Figure 1D:
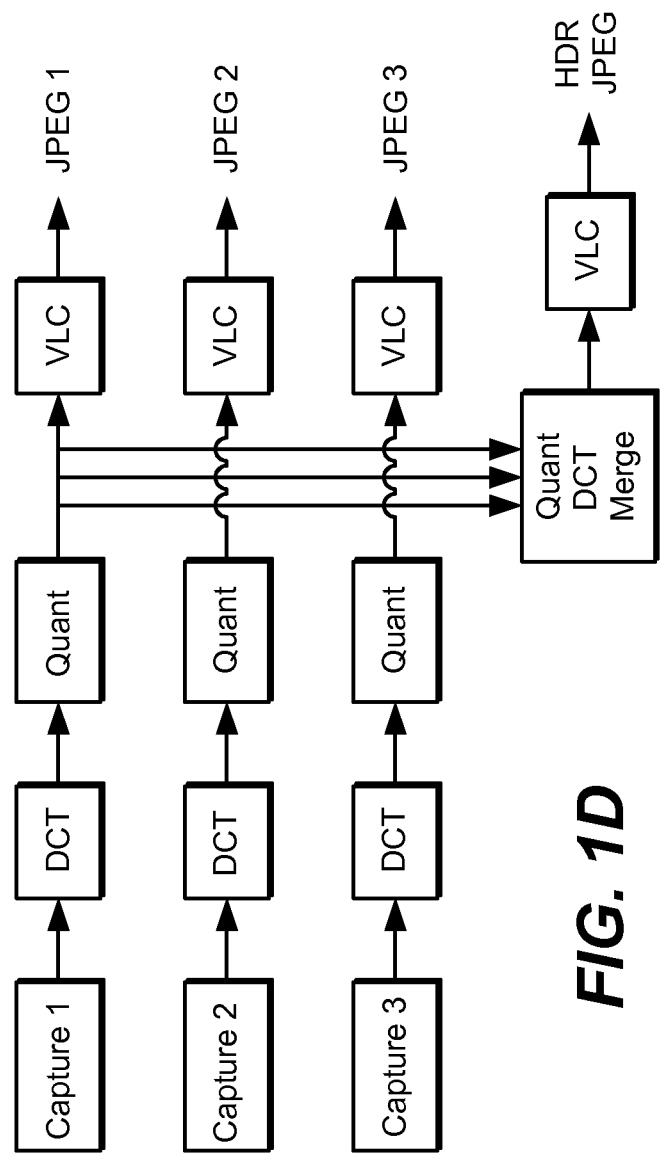

FIG. 1D illustrates example components to process multiple uncompressed images (e.g., captures 1 through 3) into an output HDR image (e.g., HDR JPEG) (1) with direct merging in a transform domain of luminance information from the multiple images, (2) without tone mapping, and (3) without secondary lossy compression, in accordance with some possible embodiments of the present invention. Captures 1 through 3 may be of the same scene, but captured with at least two different exposure settings.

As illustrated in FIG. 1D, separate (e.g., parallel) domain transformations (e.g., DCT) may be performed on the captures 1 through 3 to convert image data from a spatial domain to a transform domain, if the image data in the captures 1 through 3 are in the spatial domain. As illustrated, separate (e.g., parallel) quantization steps (e.g., Quant) may be performed on the image data in the transform domain into quantized coefficient blocks. In some possible embodiments, these quantized coefficient blocks may be merged directly in the transform domain (see, e.g., Quant DCT merge). The result of the merging in the transform domain of the quantized coefficient blocks may be further compressed with a lossless compression algorithm such as VLC into an output HDR image (e.g., HDR JPEG). In some possible embodiments, individual JPEG images (e.g., JPEG 1, JPEG 2 and JPEG 3) encoded with lossless compression (e.g., VLC) based on the quantized input images may also be provided as output images.

5. Merge Procedures

Various merge procedures may be used to implement techniques as described herein. FIG. 2A illustrates a relatively detailed example procedure to perform merging coefficient blocks in a transform domain derived from uncompressed or decompressed images (e.g., images 128-1 through 128-3) originally in a transform domain, in accordance with some embodiments of the present invention. In some possible embodiments, the procedure here may be implemented by an example image processing unit comprising one or more computing devices. In various possible embodiments, the image processing unit may comprise one or more processing components including some or all of those processing components as illustrated in FIG. 1B and FIG. 1C. The imaging processing unit may be implemented in a handheld device such as a camera, a wireless phone, a PDA, a tablet computer, a laptop computer, a personal computer, a server, a media processing system, a media rendering system, a theater system, a media studio system, image processing software, image rendering software, etc.

In step I of FIG. 2A, the image processing unit may receive two or more input images comprising transform domain image data with different exposure settings. The two or more input images may be two or more shots taken with different exposure settings, for example, by a point-and-shoot camera or a handheld device, of which the image processing unit may or may not be an integral part.

In various possible embodiments, different exposure settings may be realized by setting different mechanical filters, time, gain/sensitivity on the cells or apertures, shutter speeds, aperture sizes, etc. to one or more particular values. Once an exposure setting for a camera element is set, the camera element may be differentially responsive to a particular range of luminance levels corresponding to the exposure setting. Accordingly, an input image as described herein may be created by the camera element with the exposure setting. As used herein, the phrase "a camera's elements being differentially responsive to a range of luminance levels based on an exposure setting" may mean that, for a luminance level within the range of luminance levels corresponding to the exposure setting, the camera element is capable of creating a corresponding value correctly indicating the luminance level.

In step II of FIG. 2A, the image processing unit may decompress zero, one, or more of the two or input images if it is compressed. In some possible embodiments, this decompression only involves lossless compression such as VLC. In some possible embodiments, all the input images may be compressed (e.g., a JPEG compressed image). In some possible embodiments, all the input images may be uncompressed (e.g., in the case of raw image files or JPEG uncompressed image files). For the purpose of the present invention, the image processing unit may also be configured to process the input images, even if some but not all of the input images may be compressed.

In step III of FIG. 2A, the image processing unit may parse the input images in accordance with their image formats, and may extract from each of the two or more input images (e.g., with a VLC decoder) a plurality of luma coefficient blocks, a plurality of type I chroma blocks, and a plurality of type II chroma blocks, with a color space comprising luma and chroma components. In some possible embodiments, the coefficient blocks extracted may be quantized. The quantization of the coefficient blocks may have been previously performed (e.g., at the time of generating the input images by a camera) based on a given quantization matrix.

It should be noted that, for the purpose of the present invention, other color spaces may also be used. For example, if an RGB color space is used in the input images, the imaging processing unit may invoke a color space conversion step to covert the RGB color space to the color space with a luma component. It should also be noted that, for the purpose of the present invention, other color spaces with a luma component may also be used instead of the color space with the luma and chroma components in this example procedure.

Figure 3A:
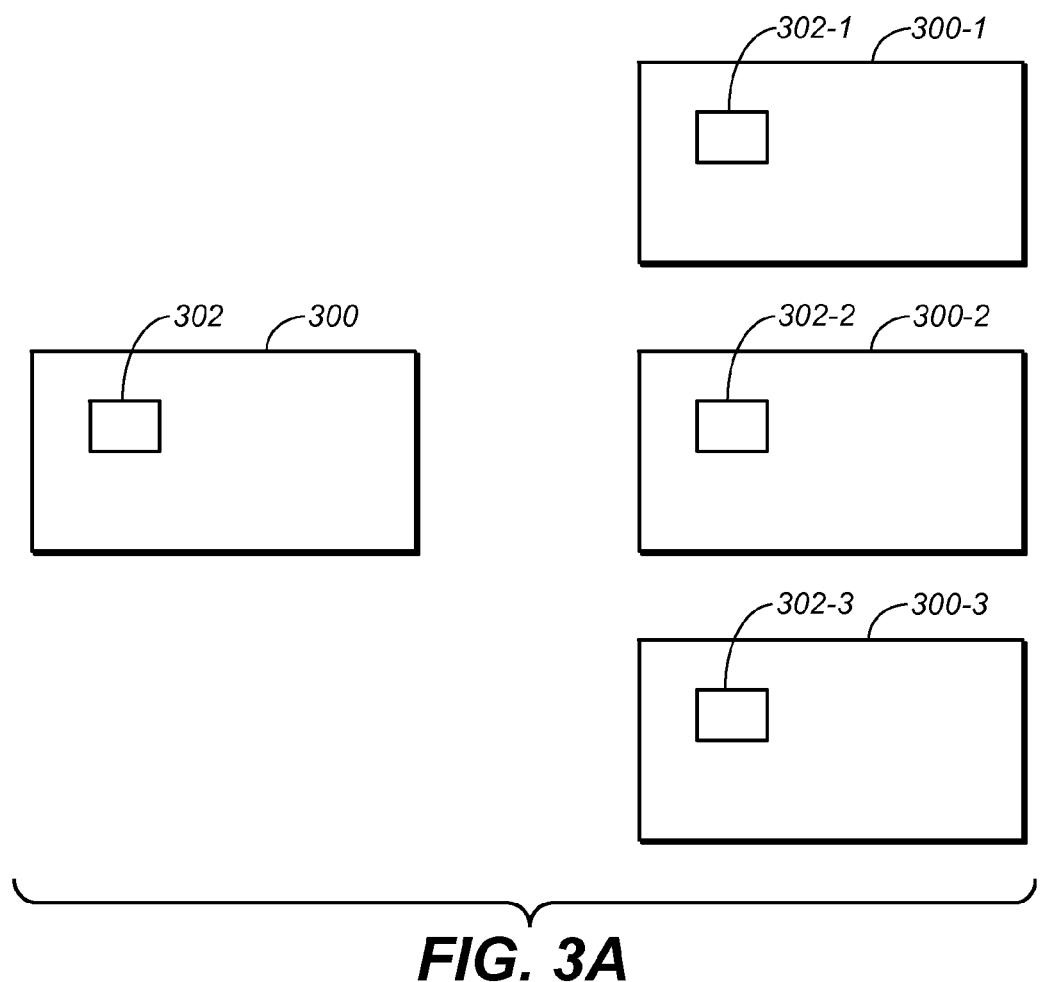
FIG. 3A through FIG. 3C illustrate example relationships between images and frames involved in transform domain merging image data, according to possible embodiments of the present invention.

As illustrated in FIG. 3A, an input image (e.g., one of the two or more input images as referred to in FIG. 2) in the transform domain may logically be represented by three frames (e.g., 300-1 through 300-3), each frame comprising a plurality of coefficient blocks of a particular channel. The input image in the transform domain may correspond to an image (300) in the spatial domain, which may or may not be an input to the example procedure of FIG. 2A.

The image (300) in the spatial domain may comprise a plurality of pixel values for a shape—which may be a rectangular shape as shown in FIG. 3A or a different geometric shape. A pixel block (e.g., 302) in the image (300) in the spatial domain may correspond to (a) a coefficient block (302-1) in a first frame (300-1) of the three frames (300-1 through 300-3), (b) a coefficient block (302-2) in a second frame (300-2) of the three frames, and (c) a coefficient block (302-3) in a third frame (300-3) of the three frames.

In some possible embodiments, the coefficient block (302-1) in the first frame (300-1) may be of a luma coefficient type, the coefficient block (302-2) in the second frame (300-2) may be of a type I chroma coefficient type, and the coefficient block (302-3) in the third frame (300-3) may be of a type II chroma coefficient type. In some possible embodiments, pixel values in the pixel block (302) may be digitally transformed into the transform domain, thereby giving rise to luma coefficients in the coefficient block (302-1) in the first frame (300-1), to type I chroma coefficients in the coefficient block (302-2) in the second frame (300-2), and to type II chroma coefficients in the coefficient block (302-3) in the third frame (300-3). In some embodiments, coefficient blocks in the transform domain from different input images correspond to one another if the coefficient blocks are of the same channel and if the coefficient blocks correspond to the same pixel block in the spatial domain. As such, the corresponding blocks may be labeled, identified, and/or addressed, e.g., by an x-y index of the pixel block.

In some possible embodiments, in a particular color space, the coefficient blocks of a particular channel in the input images as a whole may be deemed as comprising a plurality of sets of corresponding coefficient blocks of the particular channel. For example, in the YUV color space, the luma coefficient blocks in the input images as a whole may be deemed as comprising a plurality of sets of corresponding luma coefficient blocks; the type I chroma coefficient blocks in the input images as a whole may be deemed as comprising a plurality of sets of corresponding type I chroma coefficient blocks; and the type II chroma coefficient blocks in the input images as a whole may be deemed as comprising a plurality of sets of corresponding type II chroma coefficient blocks.

Figure 3B:
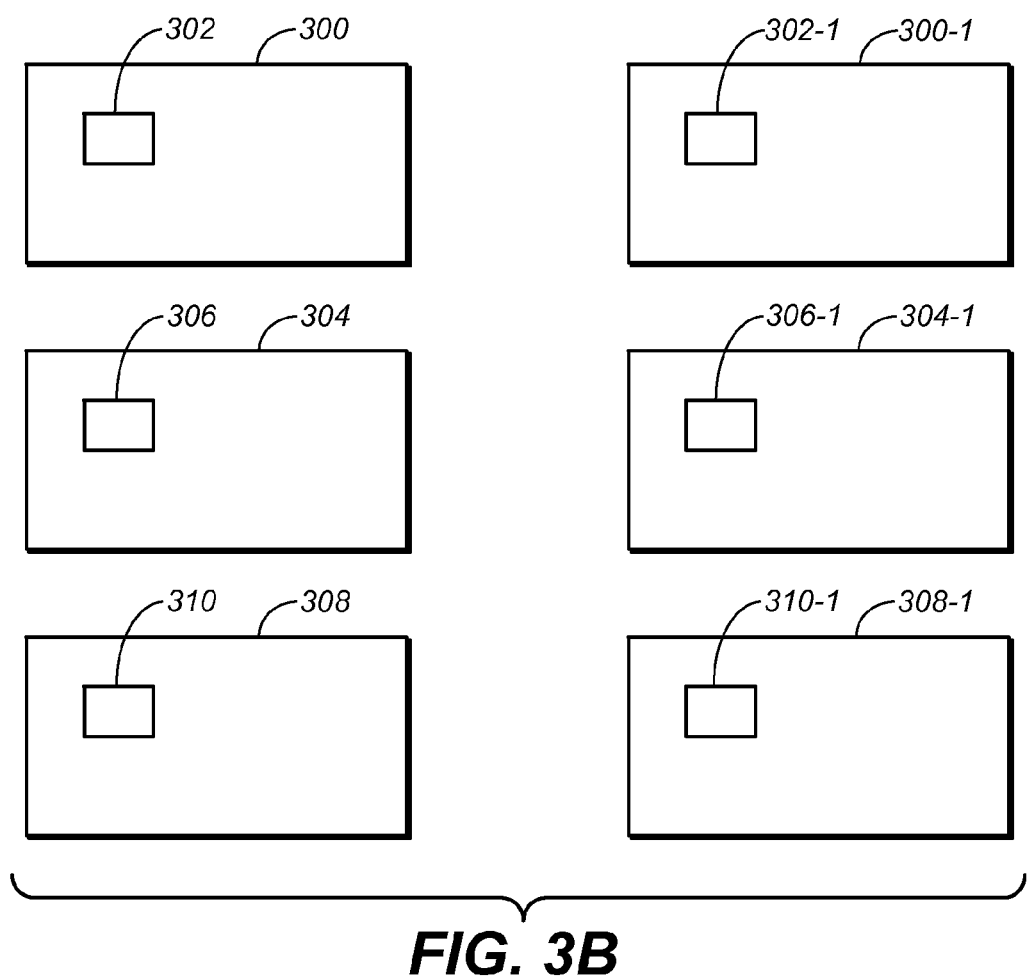

FIG. 3B illustrates an example set of corresponding coefficient blocks of a particular channel (e.g., luma, chroma, etc.), in accordance with some possible embodiments of the present invention. For the purpose of illustration, the two or more input images to the procedure of FIG. 2A may comprise a first input image, a second input image, and a third input image, all of which may be in the transform domain. A first luma coefficient block (e.g., 302-1) in a first frame (e.g., 300-1) of the first input image in the transform domain may correspond to a first pixel block (e.g., 302) in a first image (300) in the spatial domain. Similarly, a second luma coefficient block (e.g., 306-1) in a second frame (e.g., 304-1) of the second input image in the transform domain may correspond to a second pixel block (e.g., 306) in a second image (304) in the spatial domain; and a third luma coefficient block (e.g., 310-1) in a third frame (e.g., 308-1) of the third input image in the transform domain may correspond to a third pixel block (e.g., 310) in a third image (308) in the spatial domain.

If the first, second, and third pixel bocks (302, 306, and 310) of the images (300, 304, and 308) in the spatial domain all correspond to the same portion of the same scene, then the first, second, and third luma coefficient blocks (302-1, 306-1, and 310-1) of the frames of the input images in the transform domain form a set of corresponding luma coefficient blocks. A set of corresponding luma coefficient blocks may be established based on the fact that corresponding pixel blocks in the spatial domain refer to the same portion of the same scene. In addition, a set of corresponding coefficient blocks of a different channel may be established in a similar manner to that used for luma coefficient blocks.

Referring back to FIG. 2A, in step IV, the imaging processing units may merge coefficient blocks from different input images into output coefficient blocks that are used to make up an HDR or wide dynamic range output image. Under techniques as described herein, each of the output coefficient blocks may be a weighted combination of a set of corresponding coefficient blocks in the input images.

Figure 3C:
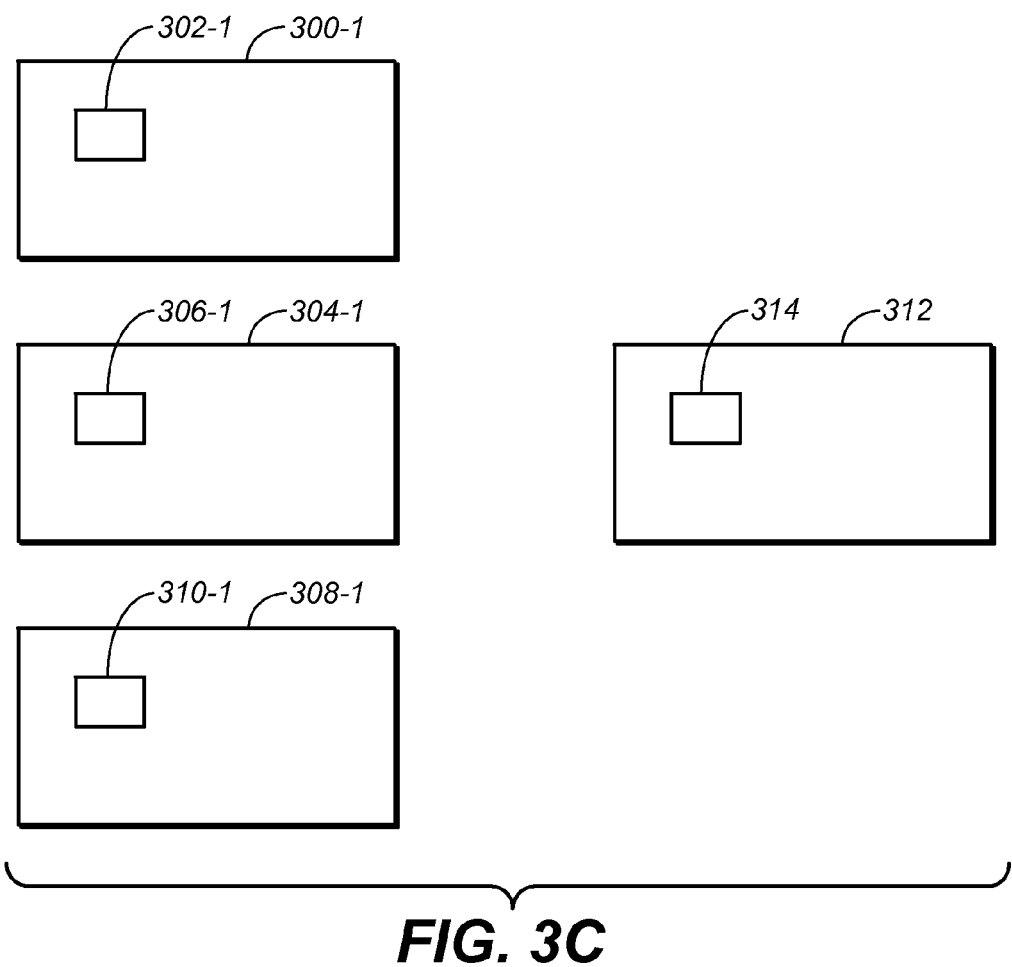

FIG. 3C illustrates an example output coefficient block (e.g., 314) in an example output frame (e.g., 312) comprising coefficients of a particular channel as generated by a set of corresponding coefficient blocks of the particular channel from input images in the transform domain, in accordance with some possible embodiments of the present invention. For the purpose of illustration only, the set of corresponding coefficient blocks may comprise a first luma coefficient block (e.g., 302-1) in a first frame (e.g., 300-1) of a first input image in the transform domain, a second luma coefficient block (e.g., 306-1) in a second frame (e.g., 304-1) of a second input image in the transform domain, and a third luma coefficient block (e.g., 310-1) in a third frame (e.g., 308-1) of a third input image in the transform domain. The first, second, and third luma coefficients in different input images in the transform domain may correspond to the same portion of a scene.

In various possible embodiments, many different ways of generating a weighted combination for the corresponding coefficient blocks in the input images may be used.

Referring to FIG. 2A, in a particular embodiment, step IV may be performed for each set of corresponding coefficient blocks in steps 1 through 3 of FIG. 2A. Step 1 of FIG. 2A may be performed for each luma coefficient block in a set of corresponding luma coefficient blocks in steps i through iii of FIG. 2A.

In step i of FIG. 2A, the image processing unit may extract one or more luma coefficients from that luma coefficient block and determine an energy value based on the one or more luma coefficients. For example, if the transform domain is that of DCT, the luma coefficient block may be represented by an (n×n) DCT coefficient matrix, where n may be a positive integer greater than one (1). The image processing unit may extract the upper-left coefficient (the DC value of the DCT coefficient matrix) of the luma coefficient matrix. The energy value as referred to in step i of FIG. 2A may be set to the DC value of the DCT coefficient matrix, and may be a function of the exposure setting for the input image. In embodiments in which a different transform domain other than DCT is used, more than one coefficient (e.g., two conjugate values in the complex domain) may be used to determine the energy value. In some possible embodiments, this energy value from the luma coefficient block in an input image in the transform domain may represent an average luminance level of a corresponding pixel block of an image in the spatial domain.

In step ii of FIG. 2A, the image processing unit may determine a weight factor for the luma coefficient block. In various possible embodiments, one of many different ways may be used to decide a weighting factor for a coefficient block.

In some possible embodiments, the weight factor for each luma coefficient block from each input image in the transform domain may be assigned the same value, e.g., one third (⅓) for three input images. In some possible embodiments, equal values may be given to weight factors for coefficient blocks if the energy values of the coefficient blocks satisfy one or more criteria. In some possible embodiments, the one or more criteria may be the same for all exposure settings. In some other possible embodiments, the one or more criteria may be different for different exposure settings.

As used herein, exposure refers to a setting associated with the process of capturing an input image of a scene; this setting limits a total amount of light that the input image is configured to receive from the scene. Depending on its exposure, an input image may be underexposed, overexposed, or mid-exposed. As used herein, luminance refers to the intensity of light that passes through or is emitted from a particular region of the scene. A scene herein may have low-luminance regions (shadows), mid-luminance regions (mid-tones), and high-luminance regions (highlights).

Techniques as described herein are used to reproduce the details of the original scene, with contributions from multiple input images. In some possible embodiments, three input images with different exposure settings (e.g., mid-exposed, underexposed, and overexposed) are used to generate an HDR image that comprises the details of various regions of the original scene. The mid-exposed image may make relatively greater contribution in mid-tone regions; the underexposed image may be incorporated to preserve highlights and make relatively greater contribution in high-luminance regions; the overexposed image may be incorporated to preserve shadow details otherwise not seen and make relatively greater contribution in low-luminance regions.

As used herein, the term "relatively greater contribution" refers to a certain contribution from an input image greater than other contributions from other input images; the certain contribution from the input image includes but is not limited only to 100% contribution; the other contributions from other input images include but are not limited only to 0% contributions.

As used herein, a "mid-exposed" image may refer to one of two or more (not necessarily three as in the present example) images that is determined as comprising a large amount of mid-tone details of the scene relative to another input image or other input images; the mid-exposed image may be one of two input images, or may be one of three or more images. In some possible embodiments, energy levels in the input images for the same spatial location of the scene, or average energy levels of the input images in their entireties, may be used to sort/rank exposure settings of input images. A mid-exposed image may be identified among the input images. In some possible embodiments, metadata associated with the input images may be used to determine which of the input images is mid-exposed, which of the input images is underexposed, or which of the input images is overexposed. In some possible embodiments, histograms of energy levels extracted from input images may be used to determine which of the input images is mid-exposed, which of the input images is underexposed, or which of the input images is overexposed. In the case of two input images, one of the two input images may be selected based on the metadata and/or histograms as the mid-exposed image, while the remaining one is determined as an underexposed image (with no overexposed input image), or as an overexposed image (with no underexposed input image).

In some possible embodiments, the energy level histogram of the mid-exposed image may be used to segment the original scene into low-luminance, mid-luminance, and high-luminance regions. For a high-luminance region, the underexposed input image preserves highlights so it gets more weight; the image processing unit may assign weight factor values to overexposed image, middle exposed image, and underexposed image in an ascending order. For a low-luminance region, the overexposed image shows shadow detail so it gets more weight; the image processing unit may assign weight factor values to underexposed image, middle exposed image, and overexposed image in an ascending order. For a mid-tone region, the middle exposure image gets more weight; for example, 50% weight to middle exposed image, 25% to underexposed image and overexposed image. In some possible embodiments, all weight factor values for all the input images add up to a fixed number, e.g., one (1).

In some possible embodiments, a region as described herein may refer to a pixel block represented by a coefficient block in the transform domain. In some possible embodiments, an output coefficient block in the transform domain, Output_block, may be associated with input coefficient blocks in the transform domain, A1, A2, A3, . . . , and An, in an expression as follows:

$$\text{Output\_block} = W1*A1 + W2*A2 + W3*A3 + \ldots + Wn*An \qquad 1.$$

Wherein W1, W2, W3, . . . Wn are weight factors assigned to A1, A2, A3, . . . An, respectively.

In some possible embodiments, a weight factor for an input luma coefficient block in the transform domain may be assigned selective values, depending on (1) whether the luma coefficient block is a luma coefficient block in a mid-exposed image, an underexposed image, or an overexposed image, and (2) whether the luma coefficient block in the mid-exposed image is underexposed, overexposed, or mid-exposed. In some possible embodiments, if the luma coefficient block in the transform domain is determined as from the mid-exposed image, the image processing unit may determine whether the energy level of the luma coefficient block is within a normal exposure range. If so, the luma coefficient block is assigned a relatively large weight. If not, the luma coefficient block may be given a relatively small weight, including zero weight. If the energy level of the luma coefficient block from the mid-exposed image is below the lower threshold of the normally exposure range, the image processing unit may assign a relatively high weight to a luma coefficient block from the overexposed image; this luma coefficient block from the overexposed image corresponds to the same spatial location of the scene as the luma coefficient block from the mid-exposed image. If the energy level of the luma coefficient block from the mid-exposed image is above the upper threshold of the normally exposure range, the image processing unit may assign a relatively high weight to a luma coefficient block from the underexposed image; this luma coefficient block from the underexposed image corresponds to the same spatial location of the scene as the luma coefficient block from the mid-exposed image.

In some possible embodiments, the image processing unit may determine the normally exposed range using the energy level histogram of energy values of a plurality of luma coefficient blocks from the mid-exposed image. Based on the histogram, the image processing unit may set one or more criteria including the upper and lower thresholds related to the normal exposure range as mentioned above. In some possible embodiments, thresholds or criteria may be location varying. For example, a scene may be divided into several spatial portions. Each spatial portion of the scene may have, or be configured with, different thresholds or criteria for determining a normally exposure range.

In step iii of FIG. 2A, the image processing unit may merge all the luma coefficient blocks in the set of corresponding luma coefficient blocks (302-1, 306-1, and 310-1) as a weighted combination/sum using weight factors determined above, thereby generating an output luma coefficient block (314)

In step 2 of FIG. 2A, the image processing unit may generate an output type I chroma coefficient block that corresponds to the luma coefficient block. In some possible embodiments, steps similar to steps i through iii may be used to generate the output type I chroma coefficient block. In some possible embodiments, the type I chroma coefficient block may be selected from the input image from which the luma coefficient block is assigned with the largest weight factor value in the set of corresponding luma coefficient block. In some possible embodiments, the type I chroma coefficient block may be selected from a mid-tone exposed input image, or a weighted combination from two or more mid-tone exposed input images.

In step 3 of FIG. 2A, the image processing unit may generate an output type II chroma coefficient block that corresponds to the luma coefficient block. In some possible embodiments, this may be done in a similar manner to that of step 2 of FIG. 2A.

In step V of FIG. 2A, the image processing unit may output an HDR image comprising output luma coefficient blocks, output type I chroma coefficient blocks, and output type II chroma coefficient blocks, as determined in the above described steps. The output luma coefficient blocks may logically form a frame (e.g., 312 of FIG. 3C) of luma coefficient blocks.

FIG. 2B illustrates an example procedure to perform merging coefficient blocks in a transform domain derived from uncompressed or decompressed images (e.g., images 128-1 through 128-3) originally in a spatial domain, in accordance with some embodiments of the present invention. The example procedure may be performed by an image processing unit as described herein.

In step I of FIG. 2B, the image processing unit may receive two or more input images comprising spatial domain image data with different exposure settings. The two or more input images may be two or more shots taken with different exposure settings, for example, by a point-and-shoot camera or a handheld device, of which the image processing unit may or may not be an integral part.

In step II of FIG. 2B, the image processing unit may decompress (e.g., with a full decompression to spatial domain) any of the two or input images in a spatial domain if it is compressed in the spatial domain.

In step III of FIG. 2B, the image processing unit may divide each of the input images into pixel blocks, perform color space conversion, and perform a digital transform (e.g., DCT) to convert the pixel blocks into a plurality of luma coefficient blocks, a plurality of type I chroma blocks, and a plurality of type II chroma blocks.

Steps IV and V in FIG. 2B may be performed in a similar manner as Steps IV and V in FIG. 2A.

In some possible embodiments, quantization and domain transformation, or inverse quantization, or inverse domain transformation may be performed as a part of the procedures as described herein. For example, the merged DCT coefficients in coefficient blocks may be inverse transformed to generate an HDR or wide dynamic range image in the spatial domain.

Additional processing including but not limited to artifact removing algorithms may also be performed.

6. Example Process Flow

Figure 4:
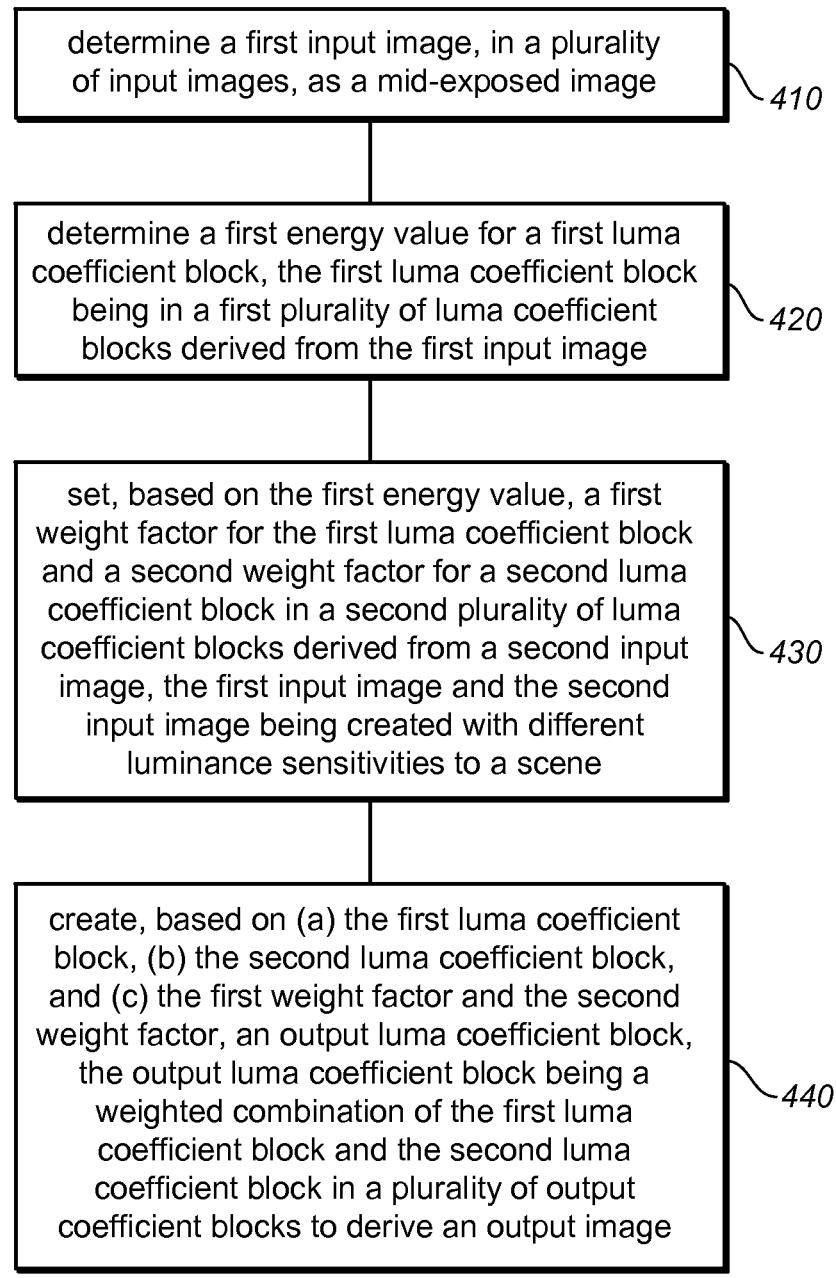
FIG. 4 illustrates an example process flow, according to a possible embodiment of the present invention.

FIG. 4 illustrates an example process flow according to a possible embodiment of the present invention. In some possible embodiments, one or more computing devices or components such as an image processing unit may perform this process flow. In block 410, the image processing unit may determine a first input image, in a plurality of input images, as a mid-exposed image. In block 420, the image processing unit may determine a first energy value for a first luma coefficient block. The first luma coefficient block may be in a first plurality of luma coefficient blocks derived from the first input image.

In block 430, the image processing unit may set, based on the first energy value, a first weight factor for the first luma coefficient block and a second weight factor for a second luma coefficient block in a second plurality of luma coefficient blocks derived from a second input image. The first input image and the second input image may be created with different luminance sensitivities to a scene.

In some possible embodiments, the first energy value may be determined by a single coefficient in the first luma coefficient block. In some other embodiments, the first energy value may be determined by two or more coefficients in the first luma coefficient block.

In block 440, the image processing unit may create, based on (a) the first luma coefficient block, (b) the second luma coefficient block, and (c) the first weight factor and the second weight factor, an output luma coefficient block. The output luma coefficient block may be in a plurality of output luma coefficient blocks to derive an output image. In some possible embodiments, each luma coefficient in the output luma coefficient block may be a weighted sum comprising contributions from a first corresponding luma coefficient in the first luma coefficient block as weighted with the first weight factor and a second corresponding luma coefficient in the second luma coefficient block as weighted with the second weight factor.

In some possible embodiments, the first input image and the second input image may be two input images among at least two input images that are combined under techniques as described herein into the output image.

In some possible embodiments, an input image as described herein may be used to derive one or more pluralities of non-luma coefficient blocks, which may include but are not limited to a plurality of chroma coefficient blocks. In some possible embodiments, the second input image may comprise one or more second pluralities of non-luma coefficient blocks, which may include but are not limited to a second plurality of chroma coefficient blocks. The output image may comprise image data derived from a plurality of output chroma coefficient blocks, which in turn may comprise at least a first coefficient block of chroma coefficients in the first plurality of chroma coefficient blocks derived from the first input image. In some possible embodiments, a chroma coefficient block in the plurality of chroma coefficient blocks may comprise a weighted sum (which may be a combination of 0%-100%, 25%-75%, 50%-50%, 75%-25%, 100%-0%, etc.) of a first chroma coefficient block in the first plurality of chroma coefficient blocks and a second chroma coefficient block in the second plurality of chroma coefficient blocks.

In some possible embodiments, an input image herein may be used to derive pluralities of coefficient blocks of different channels, which, for example, may form an YCC image representation of the scene in the transport domain.

The foregoing steps may be repeated to generate other output coefficient blocks in an output image herein. For example, in some possible embodiments, the image processing unit may determine a second energy value for a third luma coefficient block. The third luma coefficient block may be in the first plurality of luma coefficient blocks. The image processing unit may set, based on the second energy value, a third weight factor for the third luma coefficient block. The third weight factor may be the same as, or different from, the first weight factor. The image processing unit may set, based on the second energy value, a fourth weight factor for a fourth luma coefficient block in the second plurality of luma coefficient blocks. The image processing may create, based on (a) the third luma coefficient block, (b) the fourth luma coefficient block, and (c) the third weight factor and the fourth weight factor, a second and different output luma coefficient block, the second output luma coefficient block being in the plurality of output coefficient blocks.

In some possible embodiments, the first luma coefficient block may form a digital representation, in the transform domain, of luma values for a pixel block comprising two or more pixels among a plurality of pixels in a spatial domain image of the scene. The digital representation may be, but is not limited to, a linear representation. In some possible embodiments, the digital representation may be derived by transforming spatial-domain image data comprising luma values on a pixel-by-pixel basis from a spatial domain to the transform domain.

In some possible embodiments, the image processing unit may receive an uncompressed version of the first input image, and derive the first coefficient block from the uncompressed version of the first input image without performing decompression.

In some possible embodiments, the image processing unit may receive a compressed version of the first input image, and decompress the compressed version of the first input image into an uncompressed version of the first input image. In some possible embodiments, the compressed version of the first input image may have been compressed with two or more types of compressions (e.g., both VLC encoding and quantization, etc.). In these embodiments, coefficient blocks in a compressed form (e.g., quantization) may be merged in the transform domain after VLC decoding.

In some possible embodiments, the image processing unit may determine another energy value for another luma coefficient block. The other luma coefficient block may be in another plurality of luma coefficient blocks in another input image in the transform domain. The image processing unit may set, based on the other energy value, another weight factor for the other luma coefficient block. In a particular possible embodiment, the image processing unit may create the output luma coefficient block based on some or all of (a) the first luma coefficient block, (b) the second luma coefficient block, (c) the other luma coefficient block, and (d) the first weight factor, the second weight factor, and the other weight factor.

In some possible embodiments, the image processing unit may perform additional processing on the output image.

In some possible embodiments, the transform domain may be associated with a Digital Cosine Transform (DCT). In some other possible embodiments, the transform domain may be associated with a digital transform other than a Digital Cosine Transform (DCT).

In some possible embodiments, the image processing unit may receive a first version of the first input image, and retrieve the first coefficient block from the first version of the first input image without performing a color space conversion. The first version of the first input image may comprise image data encoded in a color space with a luma component.

In some possible embodiments, the image processing unit may receive a first version of the first input image, convert the first version of the first input image into a second version of the first input image, and retrieve the first coefficient block from the second version of the first input image. Here, the second version of the first input image may comprise image data encoded in a color space with a luma component, while the first version of the first input image comprising image data may be encoded in a color space without a luma component.

In some possible embodiments, at least one of the first input image and the second input image may be sourced from a digital photographic image file. The digital photographic image file may be in one of a plurality of digital image formats at least comprising a Joint Photographic Experts Group (JPEG) format.

In some possible embodiments, an input image as described herein may be sourced from a digital video file. The digital video file may be in one of a plurality of digital video formats at least comprising a Moving Picture Experts Group (MPEG) format.

In some possible embodiments, the first input image and the second input image may comprise non-high-dynamic-range (non-HDR) images of the scene, while the output image comprises an HDR image of the scene.

In some possible embodiments, the first input image and the second input image may comprise no tone-mapped image approximating an HDR image of the scene, while the output image may comprise a tone-mapped image approximating an HDR image of the scene.

In some possible embodiments, the output luma coefficient block in the output image may comprise a weighted combination, based on a first set of weighted factors for input images, of the first luma coefficient block in the first plurality luma coefficient blocks and the second luma coefficient block in the second plurality of luma coefficient blocks. A different output luma coefficient block in the output image may comprise a different weighted combination, based on a different set (e.g., location dependent) of weighted factors for the input images, of a first different luma coefficient block in the first plurality of luma coefficient blocks and a second different luma coefficient block in the second plurality of luma coefficient blocks.

In some other embodiments, another output luma coefficient block in the output image comprises another weighted combination, based on the same set of weighted factors for the input images, of a first other luma coefficient block in the first plurality of luma coefficient blocks and a second other luma coefficient block in the second plurality of luma coefficient blocks.

In some possible embodiments, the image processing unit may analyze one or more histograms of energy values derived from luma coefficient blocks in one or more of the input images. The plurality of output luma coefficient blocks in the output image may comprise weighted combinations of luma coefficient blocks derived from two or more of the input images.

In some possible embodiments, the image processing unit may set a first set of thresholds for a normal exposure range for the first input image.

In some possible embodiments, the image processing unit may determine whether the first energy value is within a first set of thresholds. In response to determining that the first energy value is within the first set of thresholds, the image processing unit may assign a first value to the first weight factor. On the other hand, in response to determining that the first energy value is not within the first set of thresholds, the image processing unit may assign a second value to the first weight factor. This may be repeated for other energy values and other weight factors.

7. Implementation Mechanisms

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
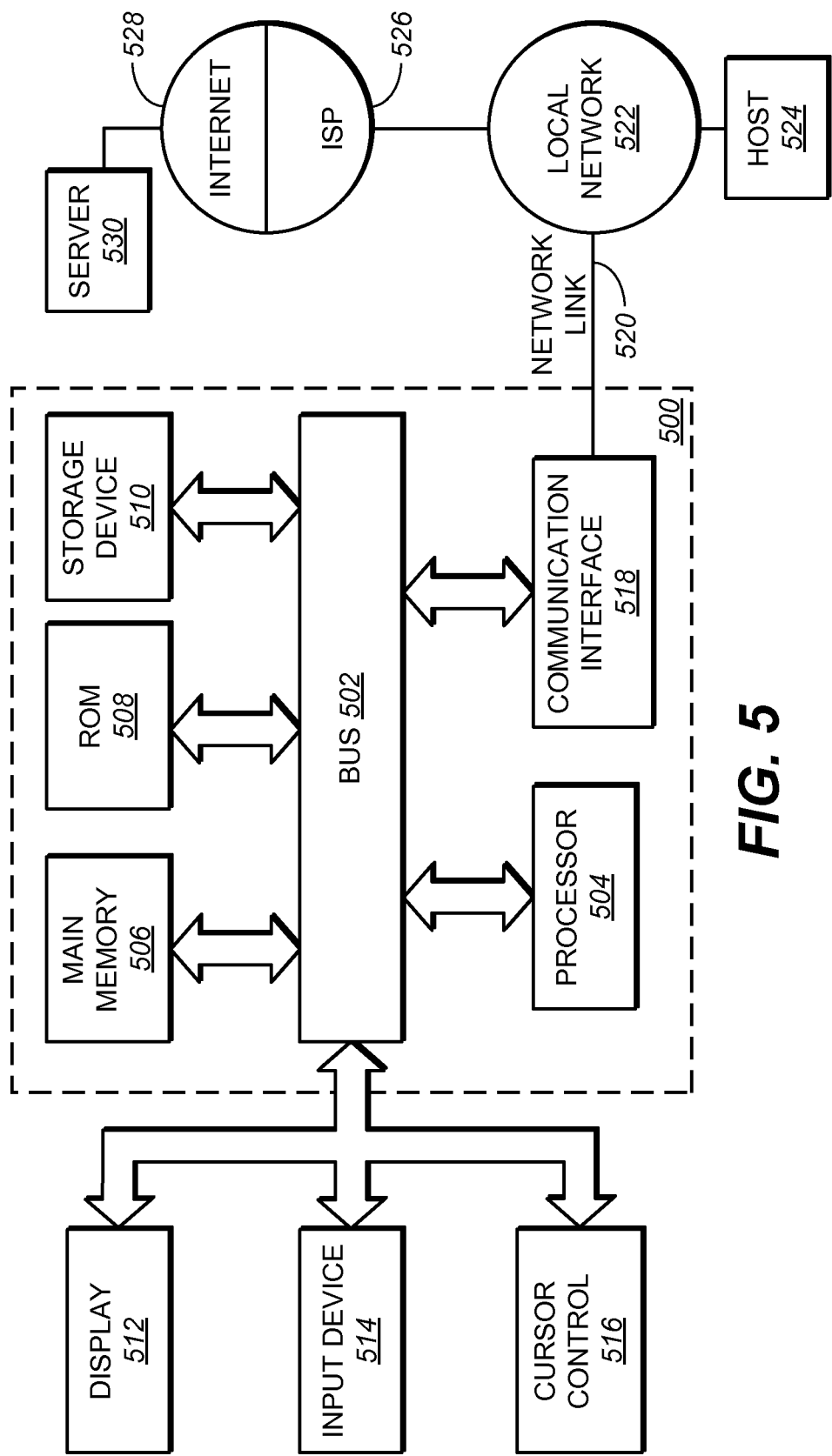
FIG. 5 illustrates an example hardware platform on which a computer or a computing device as described herein may be implemented, according a possible embodiment of the present invention.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

8. Equivalents, Extensions, Alternatives and Miscellaneous

In the foregoing specification, possible embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:
1. A method comprising:
    determining a first input image, in a plurality of input images, as a mid-exposed image;
    determining a first energy value for a first luma coefficient block, the first luma coefficient block being in a first plurality of luma coefficient blocks derived from the first input image;
    setting, based on the first energy value, a first weight factor for the first luma coefficient block and a second weight factor for a second luma coefficient block in a second plurality of luma coefficient blocks derived from a second input image, the first input image and the second input image being created with different luminance sensitivities to a scene;
    creating, based on (a) the first luma coefficient block, (b) the second luma coefficient block, and (c) the first weight factor and the second weight factor, an output luma coefficient block, the output luma coefficient block being a weighted combination of the first luma coeffi- cient block and the second luma coefficient block in a plurality of output coefficient blocks to derive an output image.

2. The method of claim 1, further comprising:
determining a second energy value for a third luma coefficient block, the third luma coefficient block being in the first plurality of luma coefficient blocks;
setting, based on the second energy value, a third weight factor for the third luma coefficient block and a fourth weight factor for a fourth luma coefficient block in the second plurality of luma coefficient blocks;
creating, based on (a) the third luma coefficient block, (b) the fourth luma coefficient block, and (c) the third weight factor and the fourth weight factor, a second output luma coefficient block in the plurality of output coefficient blocks.

3. The method of claim 1, wherein the first luma coefficient block forms a digital representation, in the transform domain, for a pixel block comprising two or more pixels among a plurality of pixels of a spatial-domain image of the scene.

4. The method of claim 3, wherein the digital representation is a linear representation.

5. The method of claim 3, wherein the digital representation is derived by transforming spatial-domain image data, comprising luminance and color values on a pixel-by-pixel basis, from a spatial domain to the transform domain.

6. The method of claim 1, further comprising:
receiving an uncompressed version of the first input image; and
deriving the first coefficient block from the uncompressed version of the first input image.

7. The method of claim 1, further comprising:
receiving a compressed version with lossy quantization and lossless entropy coding of the first input image;
decompressing the compressed version of the first input image into a quantized version of the first input image; and
deriving the first coefficient block from the quantized version of the first input image without performing inverse quantization.

8. The method of claim 1, further comprising:
receiving a compressed version with lossy quantization of the first input image;
deriving the first coefficient block from the compressed version of the first input image without decompression.

9. The method of claim 1, further comprising:
setting, based on the first energy value, another weight factor for another luma coefficient block in an other plurality of luma coefficient blocks derived from an other input image;
creating the output luma coefficient block based on (a) the first luma coefficient block, (b) the second luma coefficient block, (c) the other luma coefficient block, and (d) the first weight factor, the second weight factor, and the other weight factor.

10. The method of claim 1, wherein the first input image and the second input image are two input images among at least two input images that are combined into the output image.

11. The method of claim 1, wherein the first input image comprises image data used to derive one or more pluralities of non-luma coefficient blocks.

12. The method of claim 11, wherein the one or more pluralities of non-luma coefficient blocks comprise a plurality of chroma coefficient blocks.

13. The method of claim 1, wherein the first input image comprises image data used to derive a first plurality of chroma coefficient blocks, wherein the second input image comprises second image data used to derive a second plurality of chroma coefficient blocks, wherein the output image comprises image data derived from a plurality of output chroma coefficient blocks, and wherein the plurality of output chroma coefficient blocks comprises at least one chroma coefficient block from the first plurality of chroma coefficient blocks or the second plurality of chroma coefficient blocks.

14. The method of claim 1, wherein the first input image comprises image data used to derive a first plurality of chroma coefficient blocks, wherein the second input image comprises second image data used to derive a second plurality of chroma coefficient blocks, wherein the output image comprises image data derived from a plurality of output chroma coefficient blocks, and wherein an output chroma coefficient block in the plurality of output chroma coefficient blocks comprises a weighted sum of a first coefficient block in the first plurality of chroma coefficient blocks and a second coefficient block in the second plurality of chroma coefficient blocks.

15. The method of claim 1, wherein the first energy value is determined by a single coefficient in the first luma coefficient block.

16. The method of claim 1, wherein the first energy value is determined by two or more coefficients in the first luma coefficient block.

17. The method of claim 1, wherein the first input image comprises pluralities of coefficient blocks of different channels that form a YUV image representation of the scene in the transport domain.

18. The method of claim 1, further comprising performing additional processing on the output image.

19. The method of claim 3, wherein the transform domain is associated with a Digital Cosine Transform (DCT).

20. The method of claim 3, wherein the transform domain is associated with a digital transform other than a Digital Cosine Transform (DCT).

21. The method of claim 1, further comprising:
receiving a first version of the first input image, the first version of the first input image comprising image data encoded in a color space with a luma component; and
deriving the first coefficient block from the first version of the first input image without performing a color space conversion.

22. The method of claim 1, further comprising:
receiving a first version of the first input image, the first version of the first input image comprising image data encoded in a color space without a luma component;
converting the first version of the first input image into a second version of the first input image, the second version of the first input image comprising image data encoded in a color space with a luma component; and
deriving the first coefficient block from the second version of the first input image without performing a color space conversion.

23. The method of claim 1, wherein at least one of the first input image and the second input image is sourced from a digital photographic image file.

24. The method of claim 23, wherein the digital photographic image file is in one of a plurality of digital image formats, the plurality of digital formats at least comprising a Joint Photographic Experts Group (JPEG) format.

25. The method of claim 1, wherein at least one of the first input image and the second input image is sourced from a digital video file.

26. The method of claim 25, wherein the digital video file is in one of a plurality of digital video formats, the plurality of digital formats at least comprising a Moving Picture Experts Group (MPEG) format.

27. The method of claim 1, wherein the first input image and the second input image comprise non-high-dynamic-range (non-HDR) images of the scene, and wherein the output image comprises an HDR image of the scene.

28. The method of claim 1, wherein the first input image and the second input image do not comprise tone-mapped image approximating an HDR image of the scene, and wherein the output image comprises a tone-mapped image approximating an HDR image of the scene.

29. The method of claim 1, wherein the first input image and the second input image are acquired by a handheld computing device.

30. The method of claim 1, wherein the output luma coefficient block comprises a weighted combination, based on a first set of weighted factors for the input images, of the first luma coefficient block and the second luma coefficient block, and wherein a different output luma coefficient block in the plurality of output luma coefficient blocks comprises a different weighted combination, based on a different set of weighted factors for the input images, of a first different luma coefficient block in the first plurality of luma coefficient blocks and a second different luma coefficient block in the second plurality of luma coefficient blocks.

31. The method of claim 1, further comprising analyzing one or more histograms of energy values derived from luma coefficient blocks derived from at least one in a plurality of input images, wherein the plurality of input images includes the first input image and the second input image, and wherein the plurality of output luma coefficient blocks comprises weighted combinations of luma coefficient blocks derived from the plurality of input images.

32. The method of claim 1, further comprising setting at least a first set of thresholds in the at least two sets of thresholds corresponds to a normal exposure range for the first input image.

33. The method of claim 1, further comprising:
determining whether the first energy value is within a first set of thresholds;
in response to determining that the first energy value is within the first set of thresholds, assigning a first value to the first weight factor;
in response to determining that the first energy value is not within the first set of thresholds, assigning a second value to the first weight factor.

34. The method of claim 1, further comprising determining an average energy value for each of the input images.

35. A non-transitory computer readable storage medium, comprising software instructions, which when executed by one or more processors cause performance of any one of the methods recited in claim 1-34.

36. An image processing device comprising:
a processor configured to execute instructions to:
determine a first input image, in a plurality of input images, as a mid-exposed image;
determine a first energy value for a first luma coefficient block, the first luma coefficient block being in a first plurality of luma coefficient blocks derived from the first input image;
set, based on the first energy value, a first weight factor for the first luma coefficient block and a second weight factor for a second luma coefficient block in a second plurality of luma coefficient blocks derived from a second input image, the first input image and the second input image being created with different luminance sensitivities to a scene;
create, based on (a) the first luma coefficient block, (b) the second luma coefficient block, and (c) the first weight factor and the second weight factor, an output luma coefficient block, the output luma coefficient block being a weighted combination of the first luma coefficient block and the second luma coefficient block in a plurality of output coefficient blocks to derive an output image.

* * * * *